United States Patent
Hu et al.

(10) Patent No.: US 11,120,280 B2
(45) Date of Patent: Sep. 14, 2021

(54) GEOMETRY-AWARE INSTANCE SEGMENTATION IN STEREO IMAGE CAPTURE PROCESSES

(71) Applicant: Argo AI, LLC, Pittsburgh, PA (US)

(72) Inventors: Xiaoyan Hu, San Jose, CA (US); Michael Happold, Pittsburgh, PA (US); Cho-Ying Wu, Los Angeles, CA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

(21) Appl. No.: 16/802,970

(22) Filed: Feb. 27, 2020

(65) Prior Publication Data

US 2021/0150227 A1      May 20, 2021

Related U.S. Application Data

(60) Provisional application No. 62/935,966, filed on Nov. 15, 2019.

(51) Int. Cl.
*G06K 9/00*      (2006.01)
*G06T 7/593*      (2017.01)
(Continued)

(52) U.S. Cl.
CPC ............ *G06K 9/00805* (2013.01); *B60R 1/00* (2013.01); *G06T 7/11* (2017.01); *G06T 7/593* (2017.01);
(Continued)

(58) Field of Classification Search
None
See application file for complete search history.

(56) References Cited

U.S. PATENT DOCUMENTS 5,121,201 A * 6/1992 Seki ................... G06K 9/00362
                                                 348/143
5,298,697 A * 3/1994 Suzuki ................... B66B 1/3476
                                                 187/380

(Continued)

FOREIGN PATENT DOCUMENTS

WO    WO-2018214067 A1 * 11/2018 ............. G06T 7/248
WO       2019094843 A1     5/2019

OTHER PUBLICATIONS

Zhile Ren et al., "Cascaded Scene Flow Prediction Using Semantic Segmentation," 2017 International Conference on 3D Vision (3DV), pp. 1-9, Jun. 7, 2018, pp. 1-8.

(Continued)

*Primary Examiner* — Stefan Gadomski
(74) *Attorney, Agent, or Firm* — Fox Rothschild LLP

(57) ABSTRACT

A system detects multiple instances of an object in a digital image by receiving a two-dimensional (2D) image that includes a plurality of instances of an object in an environment. For example, the system may receive the 2D image from a camera or other sensing modality of an autonomous vehicle (AV). The system uses a first object detection network to generate a plurality of predicted object instances in the image. The system then receives a data set that comprises depth information corresponding to the plurality of instances of the object in the environment. The data set may be received, for example, from a stereo camera of an AV, and the depth information may be in the form of a disparity map. The system may use the depth information to identify an individual instance from the plurality of predicted object instances in the image.

19 Claims, 7 Drawing Sheets

(51) Int. Cl.
*G06T 7/11* (2017.01)
*B60R 1/00* (2006.01)

(52) U.S. Cl.
CPC .......... *B60R 2300/107* (2013.01); *G06T 2207/10028* (2013.01); *G06T 2207/30261* (2013.01)

(56) References Cited

U.S. PATENT DOCUMENTS

| | | | | |
|---|---|---|---|---|
| 5,581,625 | A * | 12/1996 | Connell | G06K 9/00778 382/100 |
| 6,556,704 | B1 * | 4/2003 | Chen | G06K 9/20 382/154 |
| 7,050,624 | B2 * | 5/2006 | Dialameh | H04N 13/239 382/154 |
| 7,236,622 | B2 * | 6/2007 | Chen | G06K 9/20 378/28 |
| 7,466,860 | B2 * | 12/2008 | Chang | G06K 9/00369 382/103 |
| 7,680,323 | B1 * | 3/2010 | Nichani | G06T 7/12 382/154 |
| 7,688,349 | B2 * | 3/2010 | Flickner | G06K 9/00778 348/150 |
| 8,131,010 | B2 * | 3/2012 | Senior | G06K 9/00778 382/103 |
| 8,411,963 | B2 * | 4/2013 | Luff | G06K 9/00771 382/194 |
| 8,547,437 | B2 * | 10/2013 | Buehler | G06K 9/32 348/169 |
| 8,761,442 | B2 * | 6/2014 | Srinivasan | G06K 9/00778 382/103 |
| 8,855,364 | B2 * | 10/2014 | Loos | G06K 9/00778 382/103 |
| 9,092,675 | B2 * | 7/2015 | Srinivasan | G06T 7/70 |
| 9,230,366 | B1 * | 1/2016 | McClendon | G06T 7/251 |
| 9,245,247 | B2 * | 1/2016 | Raja | G06Q 10/0631 |
| 9,626,768 | B2 * | 4/2017 | Tumanov | G06T 7/149 |
| 10,713,794 | B1 * | 7/2020 | He | G06N 3/0454 |
| 10,740,738 | B2 * | 8/2020 | Evans | G06Q 20/20 |
| 10,878,270 | B1 * | 12/2020 | Cao | G06K 9/325 |
| 2001/0048753 | A1 * | 12/2001 | Lee | G06T 7/155 382/103 |
| 2004/0258279 | A1 * | 12/2004 | Hirvonen | G06K 9/00369 382/104 |
| 2006/0095207 | A1 * | 5/2006 | Reid | G06K 9/00664 701/301 |
| 2011/0102438 | A1 * | 5/2011 | Mathe | A63F 13/52 345/426 |
| 2013/0129224 | A1 * | 5/2013 | Katz | G06T 5/002 382/199 |
| 2014/0368661 | A1 * | 12/2014 | Angot | G06T 7/11 348/164 |
| 2015/0084950 | A1 * | 3/2015 | Li | G06K 9/00214 345/419 |
| 2015/0193986 | A1 * | 7/2015 | Nistel | G06T 15/04 345/426 |
| 2015/0269739 | A1 * | 9/2015 | Ho | G06T 7/194 382/164 |
| 2015/0279018 | A1 * | 10/2015 | Bajard | H04N 13/286 382/154 |
| 2015/0324998 | A1 * | 11/2015 | Song | G06F 16/5838 382/171 |
| 2016/0093059 | A1 * | 3/2016 | Tumanov | G06K 9/4671 382/173 |
| 2016/0117830 | A1 * | 4/2016 | Salahat | G06T 7/248 382/154 |
| 2017/0124714 | A1 | 5/2017 | Sridhar et al. | |
| 2017/0206415 | A1 * | 7/2017 | Redden | G06T 7/593 |
| 2017/0352160 | A1 * | 12/2017 | Tanaka | G06F 3/011 |
| 2017/0359561 | A1 | 12/2017 | Vallespi-Gonzalez | |
| 2018/0070023 | A1 * | 3/2018 | Oh | G06T 5/002 |
| 2018/0108137 | A1 * | 4/2018 | Price | G06T 7/11 |
| 2018/0144477 | A1 * | 5/2018 | Shi | G06K 9/3233 |
| 2019/0057507 | A1 * | 2/2019 | El-Khamy | G06T 11/60 |
| 2019/0065867 | A1 * | 2/2019 | Huang | G06K 9/78 |
| 2019/0197715 | A1 * | 6/2019 | Rebecq | G06T 15/06 |
| 2019/0244362 | A1 * | 8/2019 | Movshovitz-Attias | G06T 7/136 |
| 2019/0266784 | A1 * | 8/2019 | Singh | G06N 3/08 |
| 2019/0272645 | A1 * | 9/2019 | Huang | G06N 3/08 |
| 2019/0279005 | A1 * | 9/2019 | Ogale | B60R 1/00 |
| 2019/0303699 | A1 * | 10/2019 | Dwivedi | G06T 7/50 |
| 2019/0327393 | A1 * | 10/2019 | Yang | H04N 5/2258 |
| 2019/0333237 | A1 * | 10/2019 | Javidnia | G06T 3/4007 |
| 2019/0355144 | A1 * | 11/2019 | Korobov | G06T 7/70 |
| 2020/0074657 | A1 * | 3/2020 | Zhou | G06T 5/002 |
| 2020/0074679 | A1 * | 3/2020 | Masui | G06K 9/00369 |
| 2020/0134833 | A1 * | 4/2020 | Biswas | G06K 9/342 |
| 2020/0160559 | A1 * | 5/2020 | Urtasun | G06K 9/629 |
| 2020/0184673 | A1 * | 6/2020 | Hsieh | G06T 7/174 |
| 2020/0221064 | A1 * | 7/2020 | Yerushalmy | H04N 13/128 |
| 2020/0273176 | A1 * | 8/2020 | Takeda | G06T 7/194 |
| 2020/0349763 | A1 * | 11/2020 | Chen | G06T 17/205 |
| 2021/0027471 | A1 * | 1/2021 | Cohen | G06K 9/4642 |
| 2021/0073321 | A1 * | 3/2021 | Steyer | G06K 9/00805 |
| 2021/0101286 | A1 * | 4/2021 | Lee | B25J 9/1605 |

OTHER PUBLICATIONS

Cai, Z. et al., "Cascade R-CNN: Delving into High Quality Object Detection", [cs.CV] Dec. 3, 2017.
Liang, M. et al., "Deep Continuous Fusion for Multi-Sensor 3D Object Detection", ECCV 2018 paper.
Arnab, A. et al., "Bottom-up Instance Segmentation using Deep Higher-Order CRFs", [cs.CV] Sep. 8, 2016.
Fathi, A. et al., "Semantic Instance Segmentation via Deep Metric Learning", [cs.CV] Mar. 30, 2017.
Zhang, Z. et al., Instance-Level Segmentation for Autonomous Driving with Deep Densely Connected MRFs, [cs.CV] Apr. 27, 2016.
Bai, M. et al., "Deep Watershed Transform for Instance Segmentation", [cs.CV] May 4, 2017.
Ye, L. et al., "Depth-Aware Object Instance Segmentation".
Zhang, Z. et al., "Monocular Object Instance Segmentation and Depth Ordering with CNNs" [cs.CV] Dec. 18, 2015.
De Brabandere, B. et al., "Semantic Instance Segmentation with a Discriminative Loss Function", [cs.CV] Aug. 8, 2017.
Ren, S. et al., "Faster R-CNN: Towards Real-Time Object Detection with Region Proposal Networks", [cs.CV] Jan. 6, 2016.
Li, Y. et al., "Fully Convolutional Instance-aware Semantic Segmentation", [cs.CV] Apr. 10, 2017.
Qi, C.R. et al., "Frustum PointNets for 3D Object Detection from RGB-D Data", [cs.CV] Apr. 13, 2018.
Chen K. et al., "Hybrid Task Cascade for Instance Segmentation", [cs.CV] Apr. 9, 2019.
Kirillow, A. et al., "InstanceCut: from Edges to Instances with MultiCut", [cs.CV] Nov. 24, 2016.
Dai, J. et al., "Instance-sensitive Fully Convolutional Networks", [cs.CV] Mar. 29, 2016.
He, K. et al., "Mask R-CNN", [cs.CV] Jan. 24, 2018.
Liang M. et al., "Multi-Task Multi-Sensor Fusion for 3D Object Detection", The IEEE Conference on Computer Vision and Pattern Recognition (CVPR), 2019.
Huang, Z. et al., "Mask Scoring R-CNN", [cs.CV] Mar. 1, 2019.
Liu, S. et al., "Path Aggregation Network for Instance Segmentation", [cs.CV] Sep. 18, 2018.
Wang, Y. et al., "Pseudo-LiDAR from Visual Depth Estimation: Bridging the Gap in 3D Object Detection for Autonomous Driving", [cs.CV] Jun. 14, 2019.
Neven, D. et al., Instance Segmentation by Jointly Optimizing Spatial Embeddings and Clustering Bandwidth, The IEEE Conference on Computer Vision and Pattern Recognition (CVPR), 2019, pp. 8837-8845.

(56) References Cited

OTHER PUBLICATIONS

Ku, J. et al., "Joint 3D Proposal Generation and Object Detection from View Aggregation", [cs.CV] Jul. 12, 2018.

* cited by examiner

GEOMETRY-AWARE INSTANCE SEGMENTATION IN STEREO IMAGE CAPTURE PROCESSES

RELATED APPLICATIONS AND CLAIM OF PRIORITY

This patent document claims priority to U.S. Provisional Patent Application No. 62/935,966, filed Nov. 15, 2019. The disclosure of the priority application is fully incorporated into this document by reference.

BACKGROUND

When operating in an autonomous or semi-autonomous mode, a vehicle navigates through an environment with little or no input from a driver. Therefore, successful design and deployment of vehicles that are equipped with autonomous capabilities requires that the vehicle be able to accurately perceive objects in the vehicle's environment because control decisions must be made with respect to such objects. Objects may include stationary or moving vehicles, people, bicycles and other items that are present in the field of view of the autonomous vehicle's sensors.

An autonomous vehicle typically includes one or more data gathering sensors such as stereo cameras or laser detection and ranging (LIDAR) systems that are configured to sense information about the objects in the environment of the autonomous vehicle. When identifying objects in images captured by these sensors, it is desired that the vehicle accurately determine the position of every object instance that is present in the image.

Instance segmentation is a process that segments out and labels every object of interest that is detected in a data set. In instance segmentation, if multiple objects of the same class are found in an image, the process treats each of them as distinct individual objects (i.e., instances). The position of an object instance can be determined after the object instance is segmented from other object instances in an image. The label can then be used to identify the object and relate it to the determined position.

Instance segmentation has attracted many research interests in computer vision and autonomous driving applications. Methods of instance segmentation generally fall into three categories: segmentation-based, object detection-based, and hybrid.

Instance segmentation methods usually start with semantic segmentation, which is the process of applying labels to every pixel in an image. For example, as shown in FIG. 1A, an image may include multiple people standing close enough together so that they appear to overlap each other in the two-dimensional image. In this situation, each pixel that corresponds to a person may be assigned the object label "person" 10. Image segmentation then typically clusters the pixels to identify each instance of an object. For example, FIG. 1B illustrates a segmented image in which the four instances of the "person" object have been identified and labeled (Person A 11, Person B 12, Person C 13, Person D 14). In this way, with instance segmentation each foreground pixel will include an object label and instance label.

In detection-based methods, rather than (or in addition to) detecting a pixel-accurate outline of an object or objects, the methods assign bounding boxes to each detected object. For example, in autonomous vehicles Mask R-CNN is often used to assign bounding boxes to objects in images.

Hybrid methods usually combine detection networks and per-pixel semantic segmentation.

Instance masks are widely used for object detection, object tracking and high density map constructions. In the context of instance segmentation of images, previous approaches (such as Mask R-CNN) only operate on red-green-blue (RGB) images. However, image data may be affected by illumination, color change, shadows, or optical defects. These factors can degrade the performance of image-based instance segmentation.

This document describes methods and systems that are directed to addressing the problems described above, and/or other issues.

SUMMARY

In one or more scenarios, a system detects multiple instances of an object in a digital image by receiving a two-dimensional (2D) image that includes multiple instances of an object in an environment. For example, the system may receive the 2D image from a camera or other sensing modality of an autonomous vehicle (AV). The system also may include a processor that is a component of the AV. The system uses an object detection network to generate multiple predicted object instances in the image. The system then accesses a data set that includes depth information corresponding to the instances of the object in the environment. The data set may be received, for example, from a stereo camera of the AV, and the depth information may be in the form of a disparity map. The system may use the depth information to identify an individual instance from the predicted object instances in the image Optionally, using the object detection network to generate the predicted instances of the object in the image may include using a region proposal network to output a set of bounding box proposals.

Optionally, the system may generate the data set that includes depth information by receiving a stereo image pair captured by a stereo camera and estimating a disparity map from the stereo image pair. The system may then use the depth information when identifying an individual instance from the predicted instances of the object in the 2D image by: (i) projecting the predicted instances of the object in the 2D image to the disparity map and removing a plurality of predicted 2.5D masks from the disparity map to yield a cropped disparity map; (ii) back-projecting the removed candidate masks to a three-dimensional (3D) coordinate space to yield a plurality of predicted 3D masks; (iii) generating a first score for each of the predicted instances of the object in the 2D image; (iv) generating a second score for each of the predicted 2.5D masks; (v) generating a third score for each of the predicted 3D masks; and (vi) using the first scores, the second scores and the third scores to predict a final mask. Optionally, using the first scores, the second scores and the third scores to predict the final mask may include: (a) fusing the second scores and the third scores to generate a disparity mask score for each of a plurality of candidate final masks; (b) fusing the disparity mask scores with the first scores to generate plurality of predicted final mask scores; and (c) using the final mask scores to select the final mask.

DETAILED DESCRIPTION

Figure 1A:
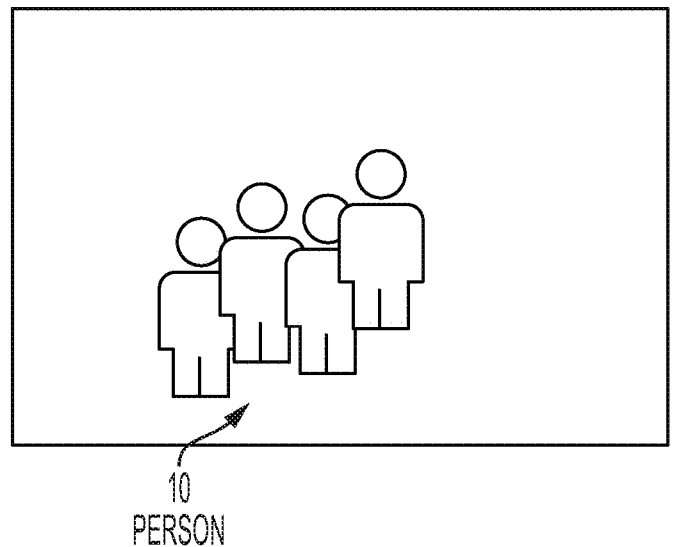
FIGS. 1A and 1B illustrate examples of semantic segmentation and instance segmentation.
Figure 1B:
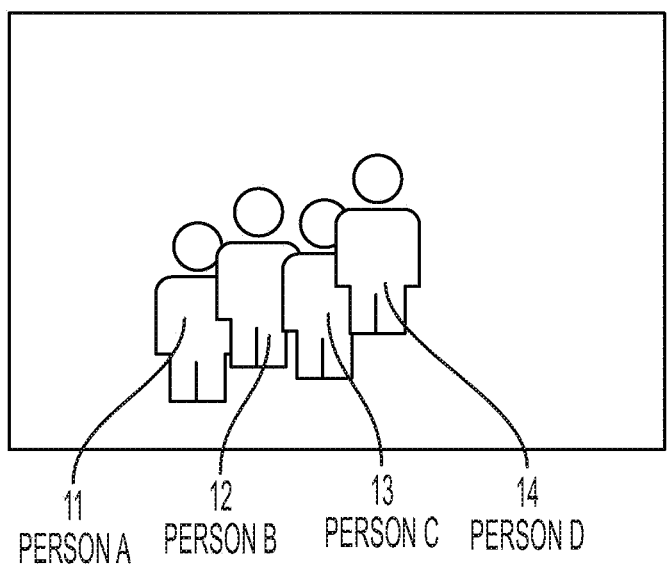

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle (AV) operating on a road needs to identify the position of objects (such as other vehicles, people, obstacles, etc.) in the environment of the vehicle to determine a safe trajectory for navigation. Other systems, such as building and other facility security systems, also must be able to distinguish individual objects from each other in captured images. As noted in the Background section above, image segmentation is currently used on RGB imagery captured by AVs other systems. This document describes a process that uses another sensing modality (such as LIDAR or a stereo camera) to capture images that provide geometric cues for the scene, and to provide depth information about the location that includes the object. The systems and methods of this disclosure may be used for segmenting images created from data collected by sensor systems such as cameras (including but not limited to stereo cameras), LIDAR systems, radar systems and other systems that can capture depth information about a scene.

For outdoor scene applications, geometric cues come from sensors such as LIDAR systems or stereo cameras. LIDAR systems are popular and common sensors for depth acquisition. Although LIDAR systems are precise, they have some disadvantages. Their performance is restricted by their power and measuring range. LIDAR measurements are also relatively sparse when aligned with images. Their spatial resolution is limited by the scanlines. Further, LIDAR systems can be expensive. In contrast, stereo cameras have a relatively lower cost, and their adjustable parameters (such as baseline and focal length) can produce higher resolutions and greater range.

"Disparity" refers to the distance between two corresponding points in the left and right image of a stereo pair. When disparity is determined for all pixels in the left and right image of a stereo image pair, the resulting data set may be referred to as a "disparity map." Recent deep learning-based stereo matching algorithms are capable of generating high quality disparity maps that rival the accuracy of depth maps produced by LIDAR systems, with much higher angular resolution. By using longer baselines and focal lengths, stereo cameras can also exceed LIDAR's working distance. Thus, although LIDAR systems also may be used in the embodiments of this document, the examples discussed below focus on the use of stereo camera image capture as the additional sensing modality.

This disclosure describes an end-to-end Geometry-Aware Instance Segmentation Network (which this document may refer to as "GAIS-Net") that takes advantage of both the semantic information from a two-dimensional (2D) image domain and the geometric information that is available from disparity maps produced by stereo cameras (or optionally depth maps produced by LIDAR systems). The GAIS-Net system extracts features and generates proposals for instance segmentation and labeling from 2D images. The system then introduces disparity maps at the region of interest (ROI) heads in the 2D images, where the encoded geometry helps the network control to regress more complete shapes. The system uses the proposals to crop out the ROIs in the disparity maps and thus identify one or more instances of distinct objects in the images.

Pseudo-LIDAR is a process for determining depth information from stereo camera images, effectively mimicking a LIDAR signal. Pseudo-LIDAR uses stereo image pairs to obtain disparities between corresponding pixels in the left and right images of the pair, and then converts the disparity of each pixel to a depth value. To disclosure of this document may adopt both a pseudo-LIDAR representation and an image-based representation using a two-dimensional convolutional neural network (2D CNN).

In addition to depth domain information, image information is semantic and thus could help an AV's 3D bounding box detection processes. The inventors have determined that using disparity information, which contains geometry information, could help 2D instance segmentation. The final mask inference may be combined through predictions from geometry and semantic information of image domain using mask confidence scoring. The system makes a final decision based on the predictions and scoring, making the output more accurate than using a single imaging modality. In some embodiments, this system only requires shape and geometry information, and does not need the actual depth values. Thus, the system does not need to convert the disparity to depth as done in current pseudo-LIDAR systems.

The system may regress masks from images, image-based disparity, and pseudo LIDAR-based disparity features. In additional to mask loss for shape control, a self-supervised correspondence loss may be used to self-guide the training from different representations, and a mask continuity loss may reduce the shape distortion problem in point-cloud sampling. At the inference time, the system may fuse the masks using a mask scoring mechanism.

Figure 2:
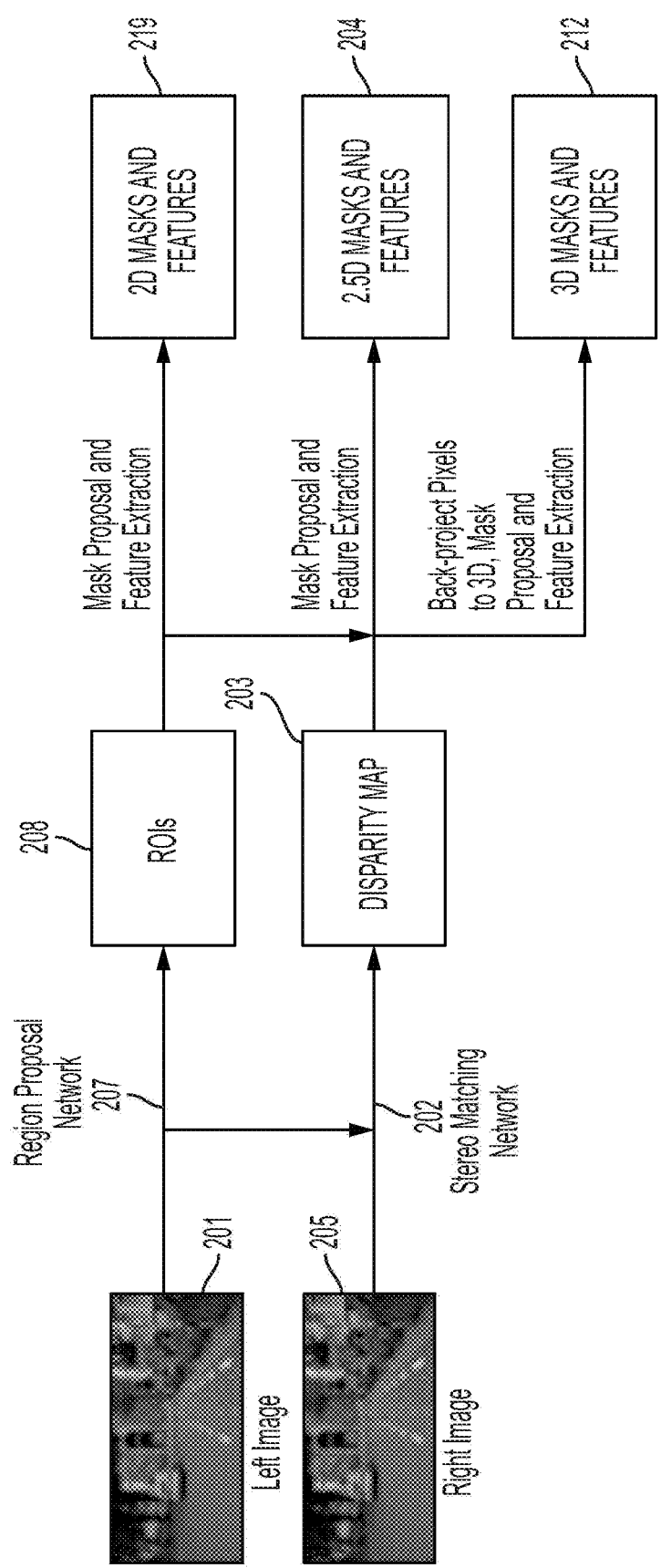
FIG. 2 illustrates an example image segmentation process according to the present disclosure.

The embodiments of this document provide an end-to-end trainable network (GAIS-Net) that can perform instance segmentation for AV operation and other applications. An example network design is shown in FIG. 2. The system segments each instance out of an image and outputs confidence scores for the bounding box and mask of each instance. To utilize the geometry information, the system may receive a pair of stereo images 201, 205 and use a stereo matching network 202 such as the Pyramid Stereo Matching Network (PSMNet) to generate a disparity map 203, and it may introduce the disparity map at the region of interest (ROI) heads of a 2D image 208.

Stereo matching is a process of estimating a disparity map 203 from a stereo image pair. A disparity map 203 is an encoding of the apparent difference of the location (i.e., the shift) of an object in corresponding images of a stereo image pair. The encoding may measure differences between coordinates of corresponding pixels in the pair of stereo images. Conventional methods of stereo matching, such as block matching or semi-global matching (SGM), usually produce sparse and incomplete disparity maps. Neural network-based approaches have shown an ability to predict dense disparity maps and may have better performance than conventional methods. The examples discussed in this document use PSMNet, which is a known pyramid stereo matching network that includes spatial pyramid pooling and a 3D convolutional neural network, to predict disparity maps. However, other stereo matching processes may be used. Passing a rectified stereo image pair into PSMNet or the other stereo matching network 202, the system may obtain the disparity map 203 projected onto the left frame. (Although the left side of the stereo camera is used in this example, in practice either the left frame or the right frame may be used.)

Object proposals, which may be in the form of proposed ROIs 208 in 2D images, are obtained by feeding 2D images from a first sensing modality (such as stereo left frame 201) into the two-stage network that includes a region proposal network (RPN) 207. The RPN 207 outputs several bounding box proposals (2D ROIs 208), representing candidate object instances. Following the steps of Faster R-CNN and Mask R-CNN, the RPN 207 may identify the object proposals/2D ROIs 208 by performing bounding box regression and/or class prediction. Also, it may predicts 2D masks for various candidate object proposals in the 2D images based on image domain features. The RPN will extract various features from the 2D ROIs 208 using any suitable feature extraction process ranging from simple feature extraction methods such as edge and corner detection, to shape-based methods such as template matching and blob extraction. The system may save and use the 2D masks 219 and corresponding features for use as will be discussed below.

The system collects these 2D masks 219 and crops out these areas from the disparity map 203. The disparity map may be generated from a second sensing modality, such as both sides of the stereo camera. We refer to these cropped out disparity map areas, which exhibit some three-dimensional (3D) characteristics but which are not fully 3D, as "2.5D" masks or 2.5D ROIs 204 in FIGS. 2 and 3 and the text below.

The system may then back-project the portions of the disparity map that are 0.5D ROIs 204 into a real, 3D coordinate space ($R^3$ space) where for each point, the first and second components describe the 2D grid coordinates, and the third component describes the disparity value. We refer to this point-cloud representation as 3D masks 210 in FIGS. 2 and 3. We also may refer to 3D masks 210 as 3D ROIs in the discussion below.

Back-projection is the process of transforming 2D image pixels (x, y) into 3D points (X, Y, Z) in the world. The process is often ill-defined because depth information is lost in the projection process and therefore the 3D point can be anywhere on the ray connecting the camera center and the 2D pixel. However, if we have disparity maps from stereo matching, the 2.5D information can be converted into depth to constrain the 3D location according to the formula:

depth=baseline*focal_length/disparity, in which baseline is a measure of the distance between the centers of the stereo camera system, and focal_length is a characteristic of the camera optical system.

If we then consider:

$K$=[focal_length 0 $cx$ 0 focal_length $cy$ 0 0 1], in which cx and cy are pixel coordinates of the center of the left camera in the stereo camera system and focal_length is a characteristic of the camera's optical system, then the 3D point location's X, Y and Z coordinates are:

$[X\ Y\ Z]$=inv($K$)*depth*$[x\ y1]$, in which inv(K) is an inverse matrix of K.

Pseudo-lidar further converts the disparity to depth. However, based on the metric error in depth $\Delta Z$, pixel matching error $\Delta m$, stereo system baseline b, and focal length f, in which $$\Delta Z| = Z^2 \frac{\Delta m}{bf},$$

the error would quadratically increase with depth. For the instance segmentation task on an image, using disparity representation is better than converting to a depth representation since disparity maps already contain shape information of objects and do not suffer from the quadratically increased error issue.

Figure 3:
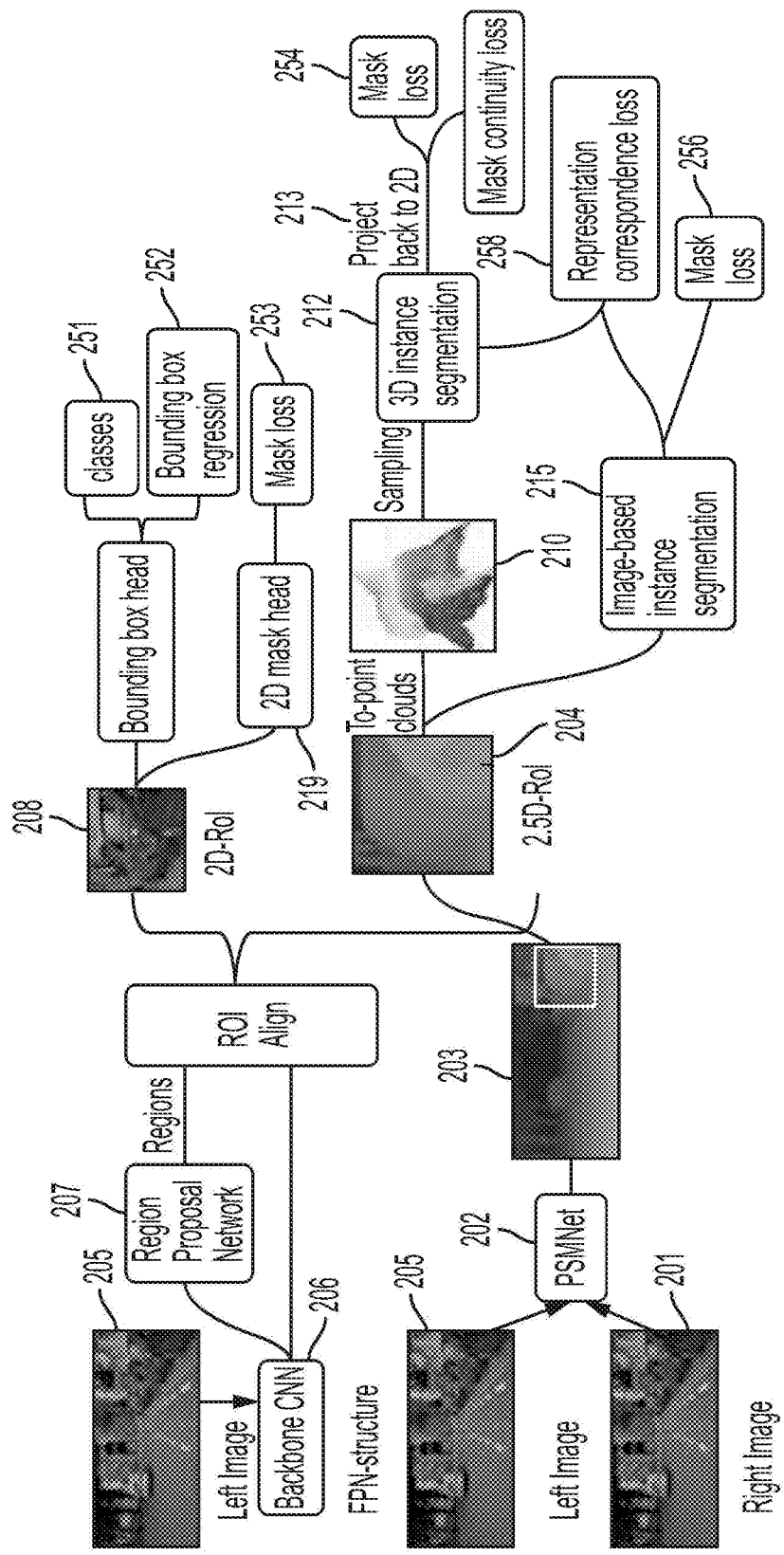
FIG. 3 illustrates an example application of the image segmentation process of FIG. 2.

FIG. 3 illustrates an example application of the process of FIG. 2, with additional detail. As in FIG. 2, in FIG. 3 the system may receive a pair of stereo images 201, 205 and use a stereo matching network 202 such as the Pyramid Stereo Matching Network (PSMNet) to generate a disparity map 203, and it may introduce the disparity map at the ROIs 208 of 2D images to yield the 2.5D ROIs 204.

Object proposals (i.e., proposed or candidate instances of an object, represented as 2D ROIs 208), are obtained by feeding 2D images (such as stereo left frame 201) into a network that includes a region proposal network (RPN) 207. For object detection in a 2D image 205, the system may use a two-stage network such as Faster R-CNN or Mask R-CNN which are generally more precise than single-stage detection networks. For example, the system may use a backbone network 206 such as ResNet50-FPN, along with an RPN 207 with non-maximum suppression (NMS). The RPN 207 outputs several bounding box proposals (2D ROIs 208), representing candidate object instances. The system may save and use the 2D masks 219 and corresponding features for use as discussed in FIG. 4 and below. Losses resulting from this process may include class losses $L_{cls}$ 251, bounding box regression losses $L_{box}$ 252, and mask loss $L_{2Dmask}$ 253.

The system collects these 2D masks 219 and crops out these areas from the disparity map 203. These cropped out disparity areas are the 2.5D masks 204.

The system may then back-project the disparity maps into a real, three-dimensional coordinate space ($R^3$ space) where for each point, the first and second components describe the 2D grid coordinates, and the third component describes the disparity value. This point-cloud representation may then be provided to the RPN 207, which provides the 3D masks (or 3D ROIs) 210. Various 3D ROIs 210 may contain different numbers of points. To make the training efficient, the system uniformly sample the 3D ROI to a set number of points, such as 1024, and collect each 3D ROI from the same image into a tensor. The system may build a PointNet structure or other instance segmentation network 212 to extract point features and perform per-point mask probability prediction. The system may re-project the 3D point features onto 2D grids 213 to calculate the mask prediction loss $L_{3Dmask}$ 254. The re-projection is efficient since it does not break the point order in the 3D instance segmentation network. As with $L_{3Dmask}$, is a cross entropy loss between the predicted mask probability and the matched groundtruth.

To fully utilize the advantage of different representations, the system may adopt the 2.5D ROI instance segmentation 204 with an image-based CNN structure instance segmentation network 215. This network 215 extracts local features of each 2.5D ROI 204, and later performs per-pixel mask probability prediction. The mask prediction loss is may be denoted as $L_{2.5Dmask}$ 256 to evaluate the predicted mask.

The system therefore performs "geometry-aware" mask prediction in images as it bundles image-based representations and point-cloud-based representations to aggregate features for mask prediction.

Figure 4:
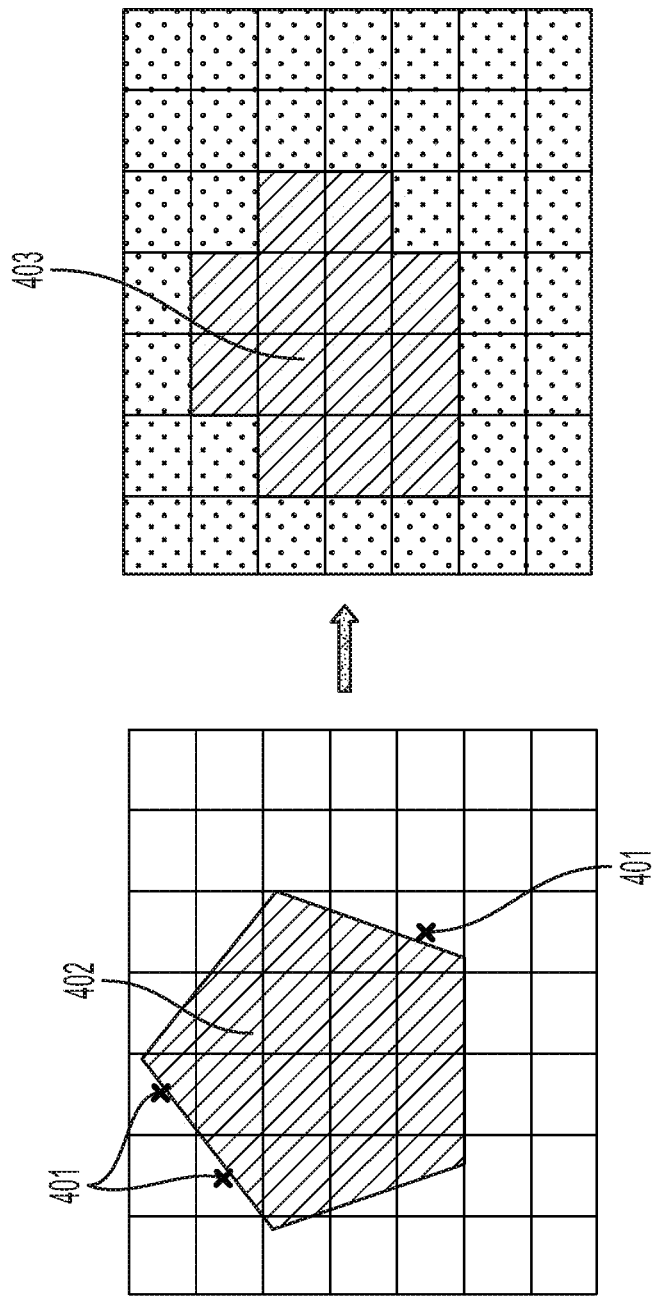
FIG. 4 illustrates an undesirable sampling example.

The system may sample the pseudo-lidar points of each 3D ROI 210 uniformly. However, the predicted mask outline may be sensitive to the sampling strategy. An example of undesirable sampling result is illustrated in in FIG. 4. As the left side of FIG. 4 shows, if a sampled point 401 (examples of which are denoted by an "x" in FIG. 4) lies just outside of an object (represented by the shaded pentagon 402), the cell would represent as the background area even though the object does appear in part of the cell. The sampled point cloud would represent a skewed shape 403 as shown on the right half of FIG. 4, and therefore it could make the output mask irregular at outlines.

To compensate for this undesirable effect, in various embodiments the system of this disclosure introduces the mask continuity loss. The predicted probability mask may be denoted as $M_{3D}$. The system may address the outline discontinuity issue shown in FIG. 4 at the predicted probability mask. Since objects are structured and continuous, the system may calculate the mask Laplacian $$\nabla^2 M = \frac{O^2 M}{Ox^2} + \frac{O^2 M}{Oy^2},$$

where x and y denote the dimensions of M. Mask Laplacian calculates the continuity of the predicted probability mask. The system may then calculate the mask continuity loss as $L_{cont} = \|\nabla^2 M\|^2$.

Figure 5:
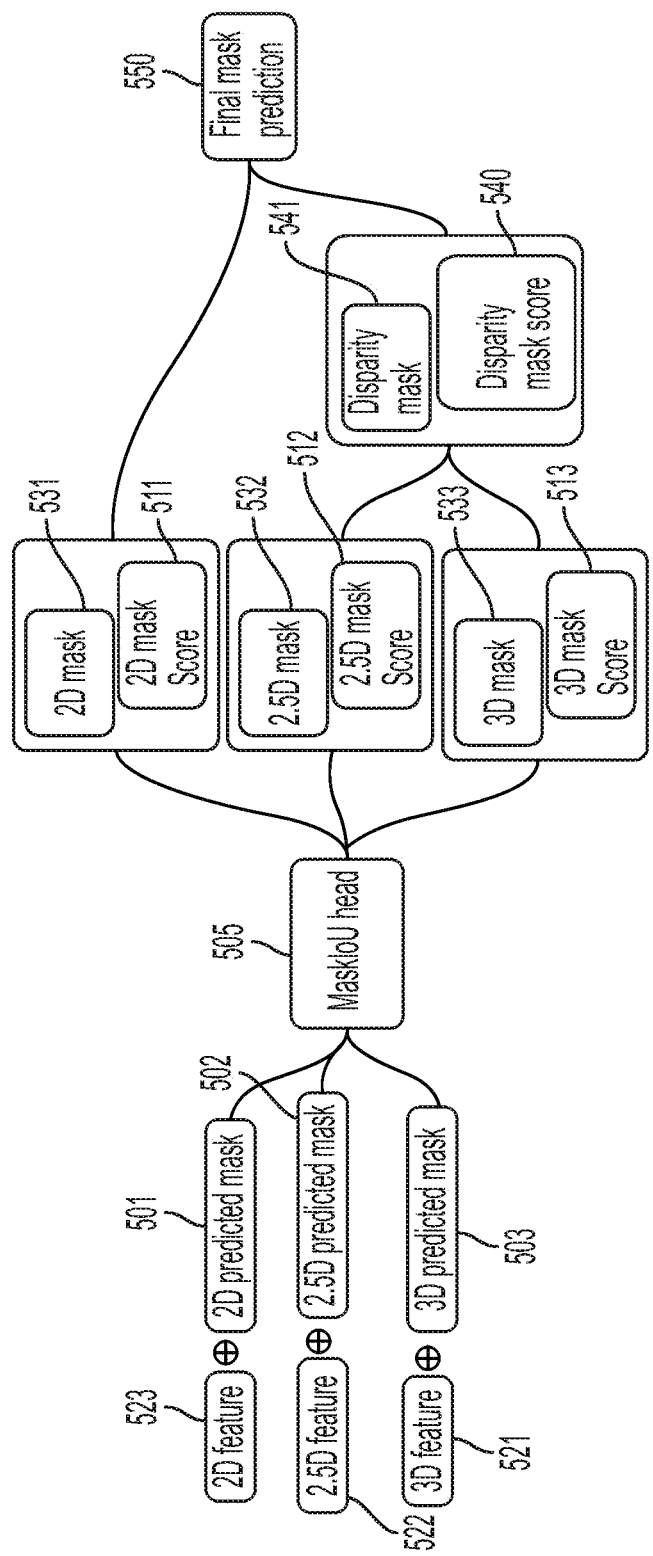
FIG. 5 illustrates an example mask fusion process.

FIG. 5 illustrates inference timeframe fusing from predictions of different representations. The system may use the 3D point-cloud-based-network and image-based network (e.g., PSMnet 202 in FIG. 3) to extract features and regress the predicted probability masks $M_{3D}$ 501 and $M_{2.5D}$ 502, The regressed $M_{3D}$ and $M_{2.5D}$ should be similar, since they are from the same source of data, the disparity map, as shown in FIGS. 2 and 3. To evaluate the similarity, the system may further calculate cross-entropy between $M_{3D}$ and $M_{2.5D}$ and formulate the result as a loss $L_{corr}$ (258 in FIG. 3). $L_{corr}$ is a self-supervised loss. The system may use different representations to guide the training processes, as different representations and network structures may extract different features. Reducing or minimizing this cross-entropy loss will make the networks of different representations supervise each other to extract more useful features for mask regressing, resulting in similar probability distributions between $M_{3D}$ and $M_{2.5D}$. Thus, the correspondence between different representations could be ensured from the same data source.

Note that Mask R-CNN uses a 14×14 feature grid after ROI pooling to regress masks. Optionally, the system of this disclosure also may use this size in the ROI mask heads. For example, for a 1024-point 3D ROI, after re-projecting back onto the image grid (32×32), the system may bilinearly downsample the grid to 14×14 in order to have a uniform mask size of all representations Referring again to FIG. 5, the system may apply a mask scoring process to regress a mask Intersection-over Union (IoU) score between each predicted mask 501, 502, 503 and its matched ground truth mask. The system may first concatenate extracted image features 521, 522, 523 and the predicted masks 501, 502, 503, and then use an additional Mask-IoU head 505 to regress the mask scores 511, 512, 513 for each mask. The score represents the quality of the predicted mask. The score may be a measure of how much overlap the predicted mask has with human labeled ground truth. A relatively larger overlap is an indicator of good prediction (i.e., the more the overlap, the better the prediction). However, the regressed mask score need not directly be used in the inference time to help control mask shapes.

The predicted mask should score high if the predicted mask's shape fits well with the ground truth mask, and it should score low if there is a misalignment between the prediction and the ground truth. The mask scoring process should not be different under different representations. Therefore, at the training stage, the system may use only 2D image features 523 and $M_{2D}$ 503 to train the MaskIoU head 505, rather than constructing three MaskIoU heads for different representations. In this way, the MaskIoU head 505 would not require much more memory use, and the training can be also effective. We denote the MaskIoU loss in this document as $L_{miou}$.

The total training loss function may be formulated as $$L_{total} = L_{cls} + L_{box} + L_{2Dmask} + W_D(L_{2.5Dmask} + L_{3Dmask}) + W_{corr}L_{corr} + W_{cont}L_{cont} + L_{cont} + W_m L_{miou}$$

where $W_D$ is the weight controlling the disparity mask loss, $W_{corr}$ is for 2.5D/3D correspondence loss, $W_{cont}$ is for 3D continuity loss, and $W_m$ is for MaskIoU loss.

During the inference time, the system may concatenate features 521, 522, 523 and predicted masks 501, 502, 503 for different representations respectively as inputs of the MaskIoU head 505. The system may adopt the mask scoring process and score every regressed mask $M_{2D}$ 531, $M_{2.5D}$ 532, and $M_{3D}$ 533. The system also may get scores $S_{2D}$ 511, $S_{2.5D}$ 512, and $S_{3D}$ 513 for each predicted mask using a mask scoring process as described above. The system may fuse these masks and predictions into a disparity mask 541 having a disparity mask score 530. The disparity mask score 530 is a score that represents a confidence level in whether the disparity mask 541 represents an instance of an object. To obtain the disparity mask score 530 for any disparity mask 541, the system may first linearly combine $M_{2.5D}$ and $M_{3D}$ using their mask scores to obtain mask a disparity mask MD 541 and mask score $S_D$ 540 for the disparity source as follows:

$$M_D = M_{2.5D} \times \frac{s_{2.5D}}{s_{2.5D} + s_{3D}} + M_{3D} \times \frac{s_{3D}}{s_{2.5D} + s_{3D}}$$

$$S_D = S_{2.5D} \times \frac{s_{2.5D}}{s_{2.5D} + s_{3D}} + S_{3D} \times \frac{s_{3D}}{s_{2.5D} + s_{3D}}$$

Next, the system may linearly combine the final mask probability map using $M_{2D}$ 531, $S_{2D}$ 511 and $M_D$ 540, $S_D$ 541 similarly. The system may obtain the final mask probability map 550 and mask scores after the mask fusion. The inferred mask may be obtained by binarizing the final map $M_f$ 550 to including all masks having a confidence level (mask score) that meets one or more criteria, such as exceeding a threshold and including one or more of certain extracted features. The system may then determine that each inferred mask in the final map $M_f$ 550 represents an individual instance of an object in the pair of stereo images that were used as inputs for the process.

Example

Current instance segmentation benchmarks lack high-resolution data with stereo pairs for driving scenes. The tests run for the following example used a very high-resolution stereo (VHRS) dataset that was captured from AVs traveling in cities. The collected images were monochromatic, and each pixel had a 12-bit response, which could generate more descriptive and robust feature for training compared with conventional 8-bit images. Note that conventional CMOS sensors only have an 8-bit response for each pixel, and later use a color filter array to obtain RGB images. The image resolution was 3255×4560 after stereo rectification. The images were center-cropped to 1024×3072.

The dataset contained approximately 6,000 images for training, approximately 1,200 images for test set 1, and approximately 1,600 images for test set 2. Test sets 1 and 2 were captured on different days and places. For ground truth annotation, we used a pretrained Mask-R-CNN on approximately 100,000 images to generate ground truth proposals. Bad predictions were then manually filtered out to create ground truth annotations for the collected data. The training set contained approximately 60,000 instances for training, test set 1 contained 10,000 instances, and test set 2 contained 15,000 instances. The class labels were "human", "bicycle/motorcycle", and "vehicle".

The GAIS-Net was implemented with Py-Torch. The backbone ResNet50-FPN was adopted with a pre-trained COCO dataset. The training settings followed Mask R-CNN experiments on a Cityscape dataset. A best model was selected within approximately 50,000 iterations. During the training and testing, the input image size was not rescaled, since downsizing could cause aliasing or blurring effects to downgrade the image quality.

The results of the VHRS test set 1 as compared to state-of-the-art methods Mask R-CNN, MS R-CNN, Cascade Mask R-CNN, and HTC4 (without semantics) using their publicly released codes and their provided COCO pretrained model are shown in Table 1 below:

TABLE 1

|  | Backbone | AP | $AP_{50}$ | $AP_{75}$ | $AP_S$ | $AP_L$ | # params |
| --- | --- | --- | --- | --- | --- | --- | --- |
| Bbox Evaluation | | | | | | | |
| Mask-RCNN | ResNet50 + FPN | 36.3 | 57.4 | 38.8 | 19.1 | 51.9 | 44.1M |
| MS-RCNN | ResNet50 + FPN | 42.2 | 65.1 | 46.6 | 20.8 | 59.6 | 60.8M |
| Cascade Mask-RCNN | ResNet50 + FPN | 37.4 | 55.8 | 38.9 | 18.0 | 54.7 | 77.4M |
| HTC | ResNet50 + FPN | 39.4 | 58.3 | 43.1 | 18.5 | 57.9 | 77.6M |
| GAIS-Net | ResNet50 + FPN | 46.0 | 67.7 | 53.3 | 23.6 | 66.2 | 62.6M |
| Mask Evaluation | | | | | | | |
| Mask-RCNN | ResNet50 + FPN | 33.9 | 53.2 | 35.5 | 14.4 | 49.7 | 44.1M |
| MS-RCNN | ResNet50 + FPN | 39.2 | 61.3 | 40.4 | 18.8 | 56.4 | 60.8M |
| Cascade Mask-RCNN | ResNet50 + FPN | 33.4 | 54.4 | 34.8 | 11.7 | 49.5 | 77.4M |
| HTC w/o semantics | ResNet50 + FPN | 34.5 | 56.9 | 36.7 | 11.6 | 52.0 | 77.6M |
| GAIS-Net | ResNet50 + FPN | 40.7 | 65.9 | 43.5 | 18.3 | 59.2 | 62.6M |

For the evaluation metrics, Table 1 reports the numerical results in standard COCO-style. Average precision (AP) averages across different IoU levels, from 0.5 to 0.95 with 0.05 as interval. $AP_{50}$ and $AP_{75}$ as 2 typical IoU levels. APE, APL for AP at different scales. The units are %. The table reports both bounding boxes and masks results. From Table 1, one can see that GAIS-Net as disclosed in this disclosure outperformed other works in nearly all metrics in the example scenarios.

Figure 6:
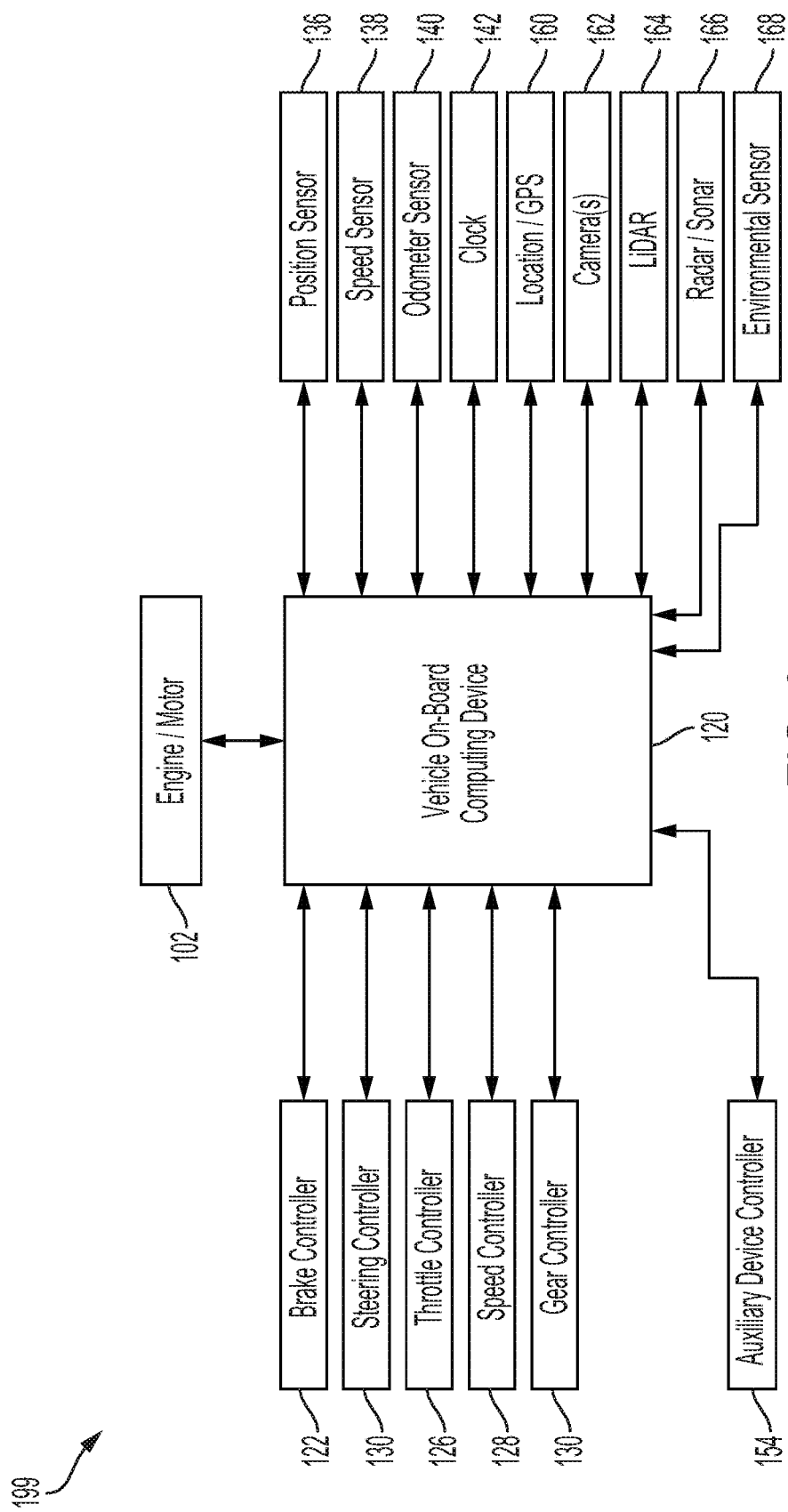
FIG. 6 illustrates example components of an autonomous vehicle.

FIG. 6 illustrates an example system architecture 199 for a vehicle, such as an AV. The vehicle includes an engine or motor 102 and various sensors for measuring various parameters of the vehicle and/or its environment. Operational parameter sensors that are common to both types of vehicles include, for example: a position sensor 136 such as an accelerometer, gyroscope and/or inertial measurement unit; a speed sensor 138; and an odometer sensor 140. The vehicle also may have a clock 142 that the system uses to determine vehicle time during operation. The clock 142 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 160 such as a global positioning system (GPS) device; object detection sensors such as one or more cameras 162; a LiDAR sensor system 164; and/or a radar and or and/or a sonar system 166. The sensors also may include environmental sensors 168 such as a precipitation sensor and/or ambient temperature sensor. The object detection sensors may enable the vehicle to detect objects that are within a given distance range of the vehicle 100 in any direction, while the environmental sensors collect data about environmental conditions within the vehicle's area of travel.

During operations, information is communicated from the sensors to an on-board computing device 120. The on-board computing device 120 analyzes the data captured by the sensors and optionally controls operations of the vehicle based on results of the analysis. For example, the on-board computing device 120 may control braking via a brake controller 122; direction via a steering controller 124; speed and acceleration via a throttle controller 126 (in a gas-powered vehicle) or a motor speed controller 128 (such as a current level controller in an electric vehicle); a differential gear controller 130 (in vehicles with transmissions); and/or other controllers. The system will also include one or more cameras 162 for capturing images of the environment. One or more of the cameras 162 may be stereo cameras to provide the stereo images used in the methods described above.

Geographic location information may be communicated from the location sensor 160 to the on-board computing device 120, which may then access a map of the environment that corresponds to the location information to determine known fixed features of the environment such as streets, buildings, stop signs and/or stop/go signals. Captured images from the cameras 162 and/or object detection information captured from sensors such as a LiDAR system 164 is communicated from those sensors) to the on-board computing device 120. The object detection information and/or captured images may be processed by the on-board computing device 120 to detect objects in proximity to the vehicle 100. In addition or alternatively, the AV may transmit any of the data to an external server for processing. Any known or to be known technique for making an object detection based on sensor data and/or captured images can be used in the embodiments disclosed in this document.

Figure 7:
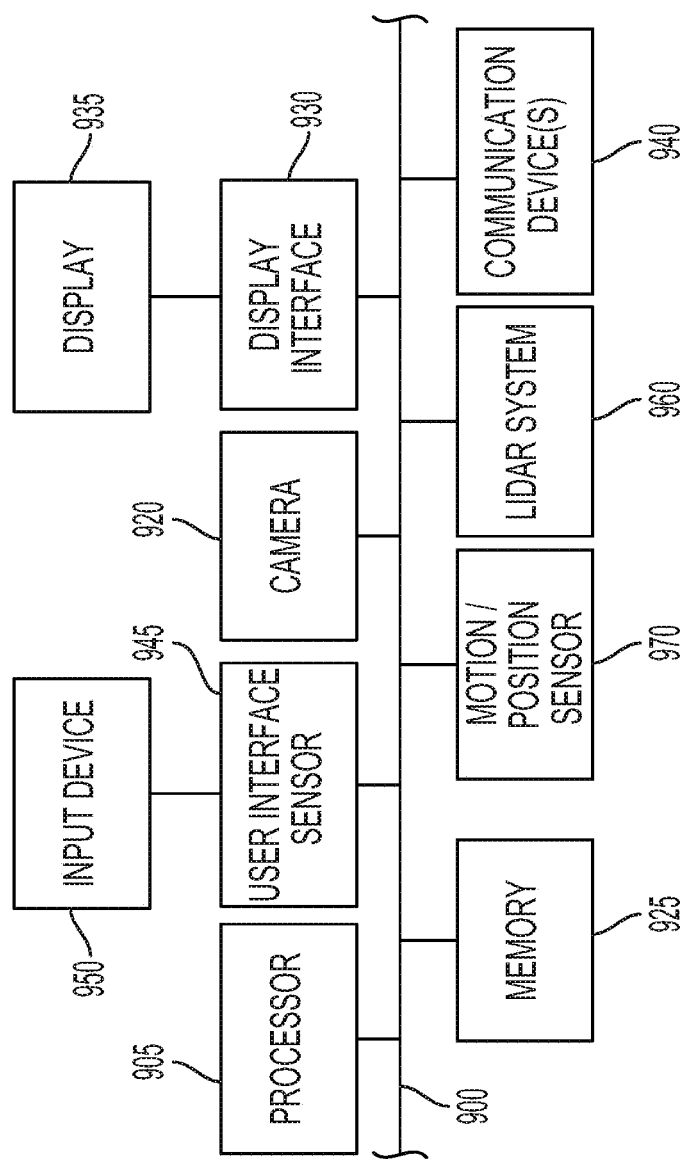
FIG. 7 is a block diagram of elements of a computing device on which the various systems and methods in this document could be implemented.

FIG. 7 depicts an example of internal hardware that may be included in any of the electronic components of the system, such as the controller (or components of the controller) of the autonomous vehicle, the control system, servers etc. described above. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, an RFID tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from sensors such as LIDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

It should be noted that while the training of the network and using the network to detect objects in this disclosure is described with respect to autonomous vehicles and objects in the environments of the autonomous vehicles, the disclosure is not so limiting. The rolling horizon training methods described above may be used for detecting objects using sensors and systems in other applications, such as perimeter monitoring/security systems, non-autonomous vehicles, and other applications.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. A client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of detecting multiple instances of an object in a digital image, the method comprising, by a processor:
    receiving a two-dimensional (2D) image that includes a plurality of instances of an object in an environment;
    using a object detection network to generate a plurality of predicted instances of the object in the 2D image;
    generating a data set that comprises depth information by receiving a stereo image pair captured by a stereo camera and estimating a disparity map from the stereo image pair;
    accessing the data set that comprises depth information corresponding to the plurality of instances of the object in the environment; and
    using the depth information to identify an individual instance from the plurality of predicted instances of the object in the image by:
        projecting the predicted instances of the object in the 2D image to the disparity map and removing a plurality of predicted 2.5D masks from the disparity map to yield a cropped disparity map,
        back-projecting the removed candidate masks to a three-dimensional (3D) coordinate space to yield a plurality of predicted 3D masks,
        generating a first score for each of the predicted instances of the object in the 2D image,
        generating a second score for each of the predicted 2.5D masks,
        generating a third score for each of the predicted 3D masks, and
        using the first scores, the second scores and the third scores to predict a final mask.

2. The method of claim 1, wherein:
    receiving the 2D image comprises receiving the 2D image from a first sensing modality of an autonomous vehicle (AV); and
    receiving the data set comprises receiving the data set from a second sensing modality of the AV.

3. The method of claim 2, wherein
    the second sensing modality comprises a stereo camera; and
    the data set that comprises depth information comprises a disparity map that is generated from an image pair captured by the stereo camera.

4. The method of claim 3, wherein receiving the 2D image comprises receiving one image from the image pair captured by the stereo camera.

5. The method of claim 1, wherein using the object detection network to generate the plurality of predicted instances of the object in the image comprises using a region proposal network to output a plurality of bounding box proposals.

6. The method of claim 1, wherein using the first scores, the second scores and the third scores to predict the final mask comprises:
    fusing the second scores and the third scores to generate a disparity mask score for each of a plurality of candidate final masks;
    fusing the disparity mask scores with the first scores to generate plurality of predicted final mask scores; and
    using the final mask scores to select the final mask.

7. A system for detecting multiple instances of an object in an image, the system comprising:
    a processor; and
    a computer-readable memory containing programming instructions that are configured to cause the processor to:
        receive a two-dimensional (2D) image that includes a plurality of instances of an object in an environment;
        use a object detection network to generate a plurality of predicted instances of the object in the 2D image;
        receive a stereo image pair captured by a stereo camera and estimate a disparity map from the stereo image pair to generate a data set that comprises depth information; and
        access the data set that comprises depth information corresponding to the plurality of instances of the object in the environment; and
        use the depth information to identify an individual instance from the plurality of predicted instances of the object in the image via additional programming instructions configured to further cause the processor to:
            project the predicted instances of the object in the 2D image to the disparity map and remove a plurality of predicted 2.5D masks from the disparity map to yield a cropped disparity map, back-project the removed candidate masks to a three-dimensional (3D) coordinate space to yield a plurality of predicted 3D masks,
generate a first score for each of the predicted instances of the object in the 2D image,
generate a second score for each of the predicted 2.5D masks,
generate a third score for each of the predicted 3D masks, and
use the first scores, the second scores and the third scores to predict a final mask.

8. The system of claim 7, wherein:
the instructions to receive the 2D image comprise instructions to receive the 2D image from a first sensing modality of an autonomous vehicle (AV); and
the instructions to receive the data set comprise instructions to receive the data set from a second sensing modality of the AV.

9. The system of claim 8, wherein
the second sensing modality comprises a stereo camera of the AV; and
the data set that comprises depth information comprises a disparity map that is to be generated from an image pair captured by the stereo camera.

10. The system of claim 9, wherein the instructions to receive the 2D image comprise instructions to receive one image from the image pair captured by the stereo camera.

11. The system of claim 7, wherein the instructions to use the object detection network to generate the plurality of predicted instances of the object in the image comprise instructions to use a region proposal network to output a plurality of bounding box proposals.

12. The system of claim 7, wherein the instructions to use the first scores, the second scores and the third scores to predict the final mask comprise instructions to:
fuse the second scores and the third scores to generate a disparity mask score for each of a plurality of candidate final masks;
fuse the disparity mask scores with the first scores to generate plurality of predicted final mask scores; and
use the final mask scores to select the final mask.

13. The system of claim 8, wherein:
the processor is a component of the AV;
the first sensing modality comprises either a right side or a left side of a stereo camera of the AV; and
the second sensing modality comprises the right side and the left side of the stereo camera.

14. A computer program embodied in a memory device, the computer program comprising programming instructions that are configured to cause a processor to:
receive a two-dimensional (2D) image that includes a plurality of instances of an object in an environment;
use a object detection network to generate a plurality of predicted instances of the object in the 2D image;
receive a stereo image pair captured by a stereo camera and estimate a disparity map from the stereo image pair to generate a data set that comprises depth information;
access the data set that comprises depth information corresponding to the plurality of instances of the object in the environment; and
use the depth information to identify an individual instance from the plurality of predicted instances of the object in the image via additional programming instructions configured to further cause the processor to:
project the predicted instances of the object in the 2D image to the disparity map and remove a plurality of predicted 2.5D masks from the disparity map to yield a cropped disparity map,
back-project the removed candidate masks to a three-dimensional (3D) coordinate space to yield a plurality of predicted 3D masks,
generate a first score for each of the predicted instances of the object in the 2D image,
generate a second score for each of the predicted 2.5D masks,
generate a third score for each of the predicted 3D masks, and
use the first scores, the second scores and the third scores to predict a final mask.

15. The computer program of claim 14, wherein:
the instructions to receive the 2D image comprise instructions to receive the 2D image from a first sensing modality of an autonomous vehicle (AV); and
the instructions to receive the data set comprise instructions to receive the data set from a second sensing modality of the AV.

16. The computer program of claim 15, wherein
the second sensing modality comprises a stereo camera; and
the data set that comprises depth information comprises a disparity map that is to be generated from an image pair captured by the stereo camera.

17. The computer program of claim 16, wherein the instructions to receive the 2D image comprise instructions to receive one image from the image pair captured by the stereo camera.

18. The computer program of claim 15, wherein the instructions to use the object detection network to generate the plurality of predicted instances of the object in the image comprise instructions to use a region proposal network to output a plurality of bounding box proposals.

19. The system of claim 14, wherein the instructions to use the first scores, the second scores and the third scores to predict the final mask comprise instructions to:
fuse the second scores and the third scores to generate a disparity mask score for each of a plurality of candidate final masks;
fuse the disparity mask scores with the first scores to generate plurality of predicted final mask scores; and
use the final mask scores to select the final mask.

* * * * *